June 3, 1952     D. E. GOMMEL     2,598,784
HACKSAW BLADE TENSIONING DEVICE
Filed Jan. 10, 1947     2 SHEETS—SHEET 1
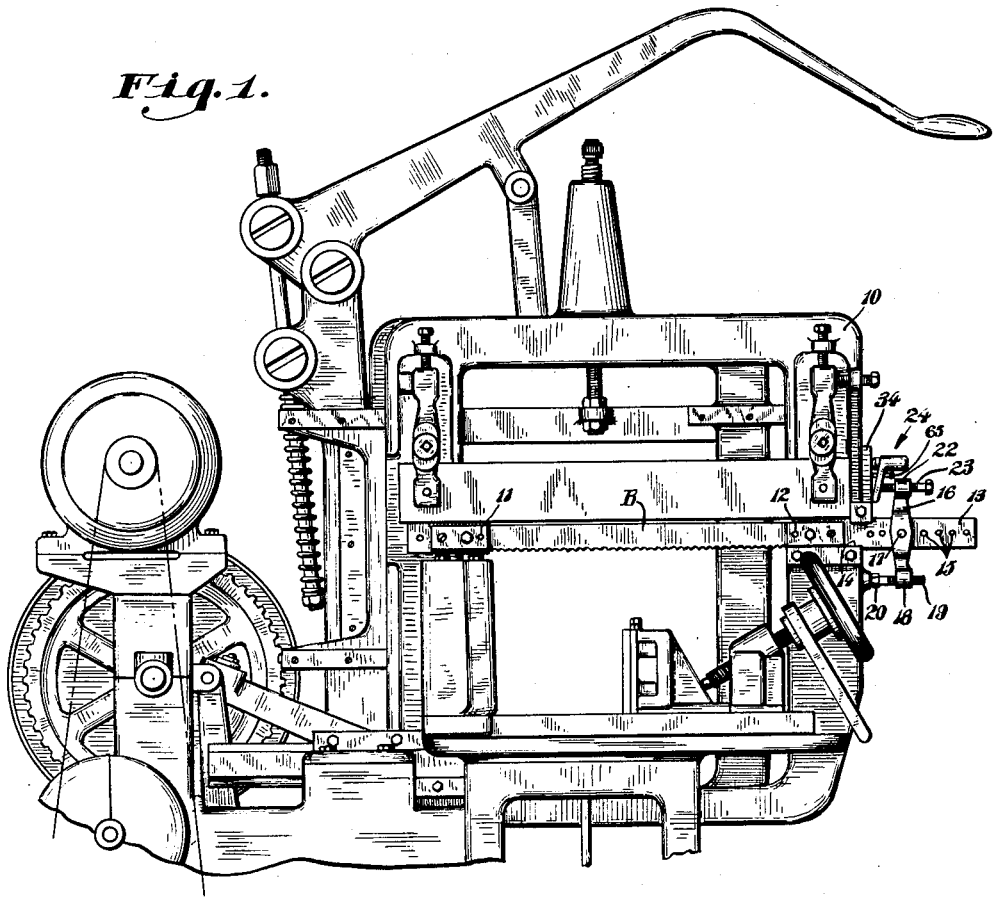
Fig. 1.
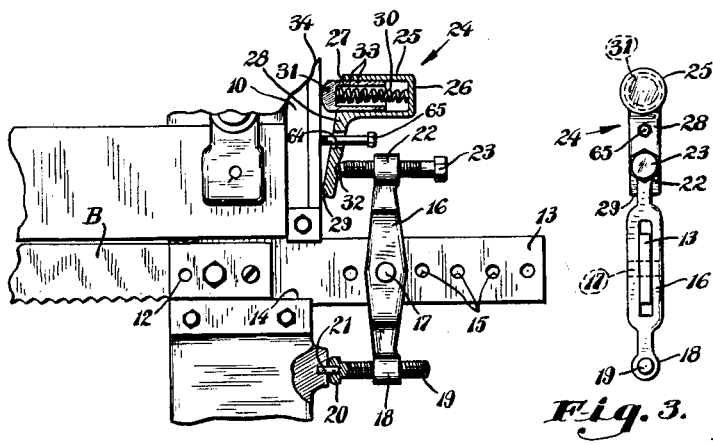
Fig. 2.
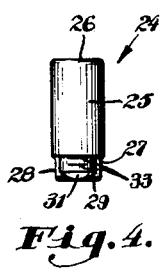
Fig. 3.
Fig. 4.
INVENTOR.
DEWEY E. GOMMEL,
BY: Harold B. Hood
ATTORNEY.

June 3, 1952  D. E. GOMMEL  2,598,784
HACKSAW BLADE TENSIONING DEVICE
Filed Jan. 10, 1947  2 SHEETS—SHEET 2
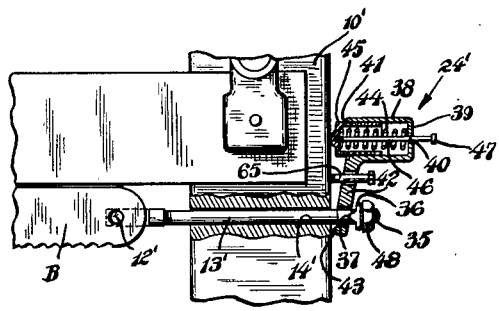
Fig. 5.
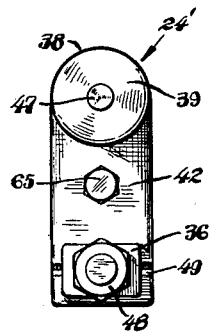
Fig. 6.
Fig. 7.
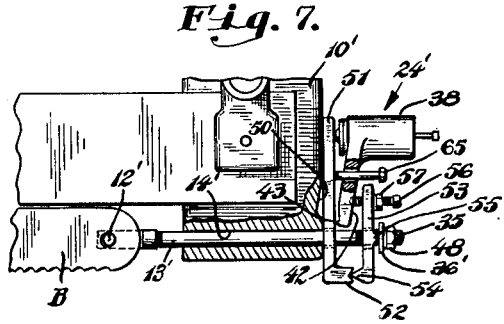
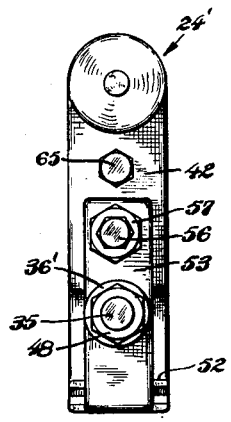
Fig. 8.
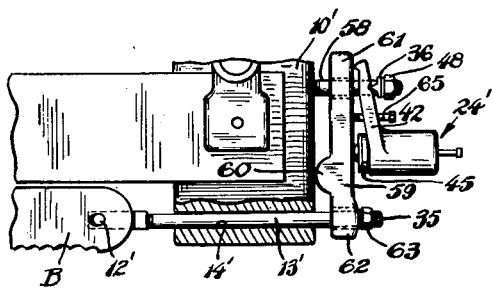
Fig. 9.
INVENTOR.
DEWEY E. GOMMEL,
BY: Harold B Hood
ATTORNEY.

Patented June 3, 1952

2,598,784

UNITED STATES PATENT OFFICE 2,598,784

HACKSAW BLADE TENSIONING DEVICE

Dewey E. Gommel, Indianapolis, Ind., assignor to E. C. Atkins and Company, Indianapolis, Ind., a corporation of Indiana Application January 10, 1947, Serial No. 721,386

16 Claims. (Cl. 143—156)

The present invention relates to a tensioning means for hack saw blades, primarily useful in mechanically driven hack saw machines. The primary object of the invention is to provide improved means for placing a blade, in such a machine, under spring tension to be maintained during operation of the machine. A further object of the invention is to provide such means which shall be readily adjustable to vary the degree of tension applied to the blade, to compensate for variations in blade length, and to be readily readable, upon inspection, whereby the operator may readily ascertain the degree of tension under which the blade is operating at the moment. Another object is to provide such means adaptable for use in various types of commercial hack saw machines.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a fragmental view of one standard form of mechanical hack saw, with my improved tensioning means applied thereto;

Fig. 2 is an enlarged fragmental elevation of a tensioning mechanism, the resilient means thereof being shown in section for clarity of illustration;

Fig. 3 is an end elevation of the parts shown in Fig. 2, as viewed from the right of Fig. 2;

Fig. 4 is a top plan view of my improved resilient means;

Fig. 5 is a fragmental elevation of the draw stud and associated parts of another form of hack saw machine, with a different embodiment of my tensioning device associated therewith;

Fig. 6 is an enlarged end elevation taken from the right of Fig. 5;

Fig. 7 is a view similar to Fig. 5, showing a further embodiment of my invention;

Fig. 8 is an enlarged end elevation taken from the right of Fig. 7; and

Fig. 9 is a view similar to Fig. 5 but showing a still further form of my tensioning means.

Referring more particularly to the embodiment of my invention shown in Figs. 1-4, it will be seen that I have shown a standard type of mechanical hack saw including a reciprocating frame comprising a body member 10 provided with a stud 11 with which may be engaged one end of a standard hack saw blade B, and a second stud 12 with which the other end of said blade is to be engaged. The stud 12 is carried by a shiftable element 13 suitably mounted in a guide 14 upon the body member 10 for adjustment toward and away from the stud 11. The element 13 may preferably be formed with a longitudinally spaced series of openings 15 therethrough, and a lever 16, which may preferably be in the form of a yoke, as is clearly shown in Fig. 3, is mounted upon the element 13 and pivotally associated therewith through the medium of a pin 17 passing through a selected one of the openings 15.

One end 18 of the lever 16 carries a threaded bolt 19 provided with a polygonal head 20 whereby said bolt may be adjusted relative to said lever end 18. The bolt head 20 is adapted to bear against the frame body member 10 and, if desired, it may be held against accidental displacement with respect to said body member by means of a pin 21 received in aligned sockets in said body member and said bolt head.

The opposite end 22 of the lever 16 likewise carries a bolt or screw 23, threadedly adjustably associated with said lever and adapted to bear against resilient means which may preferably take the form of the unit indicated generally by the reference numeral 24.

Said unit comprises a barrel 25 having a closed end 26 and an open mouth 27. Projecting radially from said barrel, and preferably rooted at or about said mouth 27, is a finger 28 which is inclined from a plane normal to the axis of the barrel 25, so that its rounded distal end 29 is positioned forwardly beyond said barrel mouth 27. A spring 30 is received in the barrel 25, one end thereof abutting the closed end of said barrel and the other end bearing against a plunger 31 axially reciprocably mounted in said barrel 25. The spring 30 is so proportioned and designed that, when in equilibrium, and with one end abutting the barrel end 26, its opposite end will project beyond the barrel mouth 27; and said spring resists movement of the plunger 31 toward said closed end 26 of the barrel.

The nose of the screw 23 engages in a suitable socket 32 formed in that surface of the finger 28 which is remote from the body member 10 when the unit 24 is interposed between said body member and the screw 23. Said socket 32 is formed intermediate the ends of the finger 28, and preferably closer to the distal end 29 thereof than to the barrel 25.

It will be clear that, when one end of a blade B is hung on the stud 11 and the other end thereof is engaged with the stud 12, tension can be applied to said blade by applying force to the element 13 in a direction toward the right as viewed in Figs. 1 and 2. The lever 16 having been associated with the proper opening 15, the screw 19 may be adjusted to bring the end 18 of said lever directly below the pin 17. If, now, the unit 24 is interposed between the body member 10 and the screw 23 in the manner shown in Figs. 1 and 2, it will be seen that adjustment of the screw 23 to produce movement thereof toward the left relative to the lever end 22 will apply such force to the element 13. Such adjustment of the screw 23 applies a corresponding degree of force to the finger 28, tending to rock the unit 24 in a counter-clockwise direction about the point of engagement of the rounded finger end 29 with the body member 10, against the tendency of the spring 30. Because of the relative position of the point of engagement of the screw with said finger, the actual quantum of force applied to the spring 30 is minimized. Therefore, compression of said spring 30 through relative movement of the barrel 25 and the plunger 31 is extremely small per hundred pounds of pressure applied by the screw 23 to the finger 28. Preferably, the plunger 31 will be provided with graduations 33 so calibrated as to indicate to the operator, when read against the mouth 27 of the barrel 25, the degree of force actually applied, through the above-described assembly, to the element 13, and so to the blade B.

I presently believe it to be advisable to provide a pillow block 34 on the body member 10 for engagement by the unit 24, primarily because of the fact that a slight vertical movement of the rounded head of the plunger 31 must result from rocking movement of the unit 24 about the end 29 of the finger 28, and therefore the unit 24 should engage a smooth and very hard surface, which will not always be found on the end of the body member 10.

Preferably, but not necessarily, the finger 28 will be perforated at 64 to pass a headed stud 65 preferably threadedly associated with the pillow block 34 and projecting therefrom in the manner clearly illustrated in Figs. 1 and 2. If the blade B breaks at a time when heavy tension is applied thereto, the unit 24 will, unless restraining means therefor is provided, fly violently away from the frame 10 under the influence of the suddenly-released energy of the spring 30. The perforation 64 being smaller than the head of the stud 65, that stud will, of course, restrain the unit 24 in such a contingency.

In Figs. 5 and 6, I have shown my tensioning device associated with a different type of hack saw machine in which the frame, a fragment of which is indicated by the reference numeral 10', provides a fixed mounting for one end of the blade B, and provides a cylindrical slideway 14' in which is reciprocably mounted an element 13' carrying a stud 12' upon which is engaged the other end of the blade B. In standard practice, the outer end of the element 13' is threaded, as at 35, for the reception of a nut which is intended to bear directly against the frame member 10' to apply tension to the blade B. According to the present invention, a compression member 36 is slidably mounted on the outer end of the member 13' and is formed, preferably, with knife blades 37 at its opposite sides adapted to cooperate with the tensioning unit 24'. Said unit is closely similar to the unit 24 of Fig. 1, comprising a barrel 38 having a bottom 39 formed with an axial port 40 therethrough, and having an open mouth 41. A finger 42 projects radially from the barrel 38, being rooted near the mouth of said barrel, and being inclined to a plane normal to the axis of the barrel, so that its distal end 43, which may preferably be sharpened, as shown, is displaced forwardly from the plane including the barrel mouth 41 and normal to the axis of said barrel. A spring 44 is received in the barrel and is confined between the bottom 39 thereof and a plunger 45, reciprocably mounted in said barrel. The plunger 45 may be calibrated in the manner, and for the purpose, described in connection with the unit 24. A headed stem 46 is reciprocably mounted in the port 40, one end thereof being threadedly engaged with the plunger 45, and the opposite end thereof extending beyond the barrel bottom and being provided with an enlarged head 47 dimensioned to prevent its passage through the port 40. It will be obvious that the stem 46 limits outward movement of the plunger 45.

A nut 48 is threadedly mounted on the threaded end 35 of the element 13' and backs up the element 36. It will be clear that, as the nut 48 is turned up on the element 13', greater and greater tension will be applied to the blade B, and the spring 44 will be compressed to a degree directly proportional to the tension thus applied to the blade. I presently prefer to form the finger 42 with V-shaped sockets 49 to receive the blades 37; and I further prefer to provide a restraining stud 65 which, in this instance, is shown threadedly associated with the frame 10.

In Figs. 7 and 8, I have shown a further modification of the tensioning means included in my invention. In some machines the outer face of the body member 10' is not flat but is formed with depressions 50, or the like. For use with such machines, I provide a pillow block 51 adapted to bridge any such depressions, and if necessary, to project beyond the frame, as shown to provide a suitable surface against which the parts of my invention may engage. In the illustrated embodiment, the pillow block is formed with an outward projection 52. A rocker 53 is slidably and rockably mounted on the projecting end of the element 13' and is formed, at one end, with a toe 54 rockably engageable with the projection 52 of the pillow block 51. Intermediate its ends, the rocker 53 may preferably be provided with an outwardly projecting protuberance 55 against which engages a washer 36' backed up by a nut 48 threadedly mounted on the threaded end 35 of the element 13'. Adjustably mounted in the opposite end of the rocker 53 is a screw 56 which will preferably be provided with a lock nut 57. Said screw 56 bears against the finger 42, preferably at a point nearer to the toe 43 thereof than to the barrel 38. Obviously, adjustment of the tension of the blade B may be effected either by adjustment of the nut 48 or by adjustment of the screw 56, or both. As in the previously-discussed embodiments of my invention, I show a restraining stud 65, here threadedly associated with the block 51.

In Fig. 9 I have shown a still further arrangement of parts in which a post 58 projects from the body member 10' upon an axis substantially parallel to the axis of the element 13'. A rocker 59, formed with a part cylindrical protuberance 60 intermediate its ends, has one arm 61 movably associated with the post 58 and its opposite arm 62 movably associated with the element 13'. A nut 63, threadedly mounted on the threaded end 35 of said element 13' bears against the rocker arm 62 to limit its movement relative to the element 13' in one direction. A member 36, in all respects like the member 36 of Figs. 5 and 6, is slidably associated with the post 58 and bears against the finger 42 intermediate the ends thereof, the toe of said finger and the plunger 45 of the unit 24' bearing against spaced points on the arm 61 of the rocker 69. The tension of the blade B, in this assembly, may be adjusted by adjustment of the nut 63 or of the nut 48, or both of them. A stud 65, in this instance shown to be threadedly associated with the rocker 59, may be used to restrain the unit 24' in the manner hereinbefore explained.

In all forms of the invention, a mechanical advantage is conferred upon the spring by the leverage provided, so that standard springs may be used to apply heavy tension upon the blades. It will be noted that where multiple leverages are used, as in the embodiments of Figs. 7 and 9, the point of pressure application upon the finger is closer to the barrel than in the more direct application as in Fig. 5. This point of pressure application, in each instance, is preferably so calculated that one standard spring and one standard calibration of the plunger will be applicable in any one of the illustrated embodiments of my invention.

I claim as my invention:

1. A hack saw frame comprising a body member, retaining means carried by said body member and engageable with one end of a blade, an element shiftably supported on said body member for movement toward and away from said retaining means, holding means carried by said element and engageable with the other end of such blade, a lever operatively connected with said element for movement relative thereto, means limiting movement of said lever in one direction relative to said element, a tensioning device comprising a first member and a second member and a spring tending to separate said members, an arm projecting from said first member, said arm and said second member bearing against relatively spaced points on said body member adjacent said element, and means threadedly associated with said lever and engaging said arm intermediate the points of engagement of said arm and said second member with said body member.

2. A hack saw frame comprising a body member, retaining means carried by said body member and engageable with one end of a blade, an element shiftably supported on said body member for movement toward and away from said retaining means, holding means carried by said element and engageable with the other end of such blade, a lever pivotally secured to said element and having portions respectively projecting oppositely therebeyond, means threadedly associated with each projecting portion of said lever, one of said last-mentioned means engaging said body member, and resilient means interposed between the other one of said last-mentioned means and said body member, said resilient means comprising an elongated member having a portion of one face in contact, adjacent one end, with said body member and spring means interposed between the body member and said face adjacent the other end, said other one of said means engaging the opposite face of said elongated means intermediate said ends.

3. A hack saw frame comprising a body member, a stud carried by said body member and engageable with one end of a blade, an element shiftably supported on said body member for movement toward and away from said stud and carrying a second stud engageable with the other end of such blade, a lever pivotally secured to said element and having a portion projecting beyond the same, means limiting pivotal movement of said lever in one direction, a screw adjustably threadedly associated with the projecting portion of said lever, and resilient means interposed between said screw and said body member, said resilient means comprising an elongated member having a portion of one face in contact, adjacent one end, with said body member and spring means interposed between the body member and said face adjacent the other end, said screw engaging the opposite face of said elongated means intermediate said ends.

4. A hack saw frame comprising a body member, retaining means carried by said body member and engageable with one end of a blade, an element shiftably supported on said body member for movement toward and away from said retaining means, holding means carried by said element and engageable with the other end of said blade, means projecting angularly from said element, a screw threadedly adjustably carried by said projecting means upon an axis substantially parallel with the line of movement of said element, and resilient means interposed between said screw and said body member, said resilient means comprising an elongated member having a portion of one face supported adjacent one end, by said body member, and spring means interposed between the body member and said face adjacent the other end, said screw engaging the opposite face of said elongated means intermediate said ends.

5. A hack saw frame comprising a body member, a stud carried by said body member and engageable with one end of a blade, an element shiftably supported on said body member for movement toward and away from said stud and carrying a second stud engageable with the other end of said blade, means projecting angularly from said element, a screw threadedly adjustably carried by said projecting means upon an axis substantially parallel with the line of movement of said element, and resilient means interposed between said screw and said body member, said resilient means comprising a barrel having a bottom and an open mouth, a finger rooted substantially at the mouth of said barrel and projecting radially and forwardly beyond said mouth at an angle to the plane of said mouth which is normal to the axis of said barrel, a plunger axially reciprocably mounted in said barrel, and a spring received in said barrel and confined between the bottom thereof and said plunger, said spring resisting movement of said plunger toward the bottom of said barrel, the distal end of said finger and said plunger bearing against said body member, and said screw bearing against that face of said finger remote from said body member and intermediate the ends of said finger.

6. A hack saw frame comprising a body member, a stud carried by said body member and engageable with one end of a blade, an element shiftably supported on said body member for movement toward and away from said stud and carrying a second stud engageable with the other end of said blade, means projecting angularly from said element, a screw threadedly adjustably carried by said projecting means upon an axis substantially parallel with the line of movement of said element, and resilient means interposed between said screw and said body member, said resilient means comprising a barrel having a bottom and an open mouth, a finger rooted substantially at the mouth of said barrel and projecting radially and forwardly beyond said mouth at an angle to the plane of said mouth which is normal to the axis of said barrel, and spring means carried in said barrel and having a relaxed length greater than the depth of said barrel, the distal end of said finger being rockably associated with said body member and said spring means being supported by said body member, whereby the intermediate portion of said finger is spaced from said body member, and said screw bearing against that face of said finger remote from said body member at a point intermediate the ends of said finger.

7. As an article of manufacture, a blade tensioning device comprising a barrel having a bottom and an open mouth, a finger projecting radially from said barrel and inclined to a plane normal to the axis of said barrel so that the distal end of said finger is located forwardly beyond said barrel mouth to serve as a rocking fulcrum for said barrel, and a coiled spring received in said barrel, abutting the bottom thereof, and having a relaxed length greater than the depth of said barrel.

8. As an article of manufacture, a blade tensioning device comprising a pair of telescopically-associated elements, a spring confined between said elements and resisting collapsing relative movement thereof, and a finger projecting radially from one of said elements and inclined from a plane normal to the common axis of said elements.

9. As an article of manufacture, a blade tensioning device comprising a barrel having a bottom and an open mouth, a plunger axially reciprocably mounted in said barrel, a spring received in said barrel, confined between the bottom of said barrel and said plunger, and resisting inward movement of said plunger, and a finger projecting radially from said barrel and inclined to a plane normal to the axis of said barrel so that the distal end of said finger is located forwardly beyond said barrel mouth to serve as a rocking fulcrum for said barrel.

10. As an article of manufacture, a blade tensioning device comprising a barrel having a bottom formed with an axial port therethrough and an open mouth, a plunger axially reciprocably mounted in said barrel, a headed stem reciprocably mounted in said port and connected to said plunger, the head of said stem being located outside said barrel and being dimensioned to prevent its passage through said port whereby said stem limits movement of said plunger away from said barrel bottom, a spring received in said barrel, confined between said barrel bottom and said plunger, and urging said plunger away from the bottom of said barrel, and a finger projecting radially from said barrel and inclined to a plane normal to the axis of said barrel so that the distal end of said finger is located forwardly beyond said barrel mouth to serve as a rocking fulcrum for said barrel.

11. A hack saw frame comprising a body member, retaining means carried by said body member and engageable with one end of a blade, an element shiftably supported on said body member for movement toward and away from said retaining means, holding means carried by said element and engageable with the other end of such blade, a tensioning device comprising an elongated member having a portion of one face rockably associated, adjacent one end, with said body member and spring means interposed between said body member and said face adjacent the other end of said elongated member, and means operatively associated with said element and adjustable relative thereto substantially in the direction of movement of said element, said last-mentioned means engaging that face of said elongated member remote from said body member, intermediate the ends of said elongated member.

12. A hack saw frame comprising a body member, retaining means carried by said body member and engageable with one end of a blade, an element shiftably supported on said body member for movement toward and away from said retaining means, holding means carried by said element and engageable with the other end of such blade, a tensioning device comprising a barrel having a bottom and an open mouth, a finger projecting from said barrel and inclined to a plane normal to the axis of said barrel so that the distal end of said finger is located forwardly beyond the open mouth of said barrel for bearing against an abutment surface supported from said body member, a coiled spring received in said barrel and confined between the bottom thereof and an abutment surface supported from said body member, and means associated with said element and adjustable to move relative thereto in the direction of movement of said element, said last-named means bearing on said finger to urge said tensioning device toward said body member against the tendency of said spring.

13. A hack saw frame comprising a body member, retaining means carried by said body member and engageable with one end of a blade, an element shiftably supported on said body member for movement toward and away from said retaining means, holding means carried by said element and engageable with the other end of such blade, a tensioning device comprising a barrel having a bottom and an open mouth, a finger projecting radially from said barrel and inclined to a plane normal to the axis of said barrel so that the distal end of said finger is located forwardly beyond the open mouth of said barrel for bearing against an abutment surface supported from said body member, a plunger reciprocably mounted in said barrel and projecting beyond the open mouth thereof for bearing against an abutment surface supported from said body member, a coiled spring received in said barrel and confined between said barrel bottom and said plunger, the free end of said element being threaded, a nut adjustably mounted on said threaded end, and means interposed between said nut and said finger to urge said tensioning device toward said body member against the tendency of said spring.

14. A hack saw frame comprising a body member, retaining means carried by said body member and engageable with one end of a blade, an element shiftably supported on said body member for movement toward and away from said retaining means, holding means carried by said element and engageable with the other end of such blade, a tensioning device comprising a barrel having a bottom and an open mouth, a finger projecting radially from said barrel and inclined to a plane normal to the axis of said barrel so that the distal end of said finger is located forwardly beyond the open mouth of said barrel, a plunger reciprocably mounted in said barrel, a coiled spring received in said barrel and confined between said barrel bottom and said plunger, the free end of said element being threaded, a rocker traversing said element, a nut adjustably mounted on said threaded end and bearing against said rocker, a pillow block traversing said element and bearing against said body member, one end of said rocker being rockably associated with said pillow block, the distal end of said finger and said plunger likewise bearing against said pillow block, and means adjustably associated with the other end of said rocker and bearing against that surface of said finger remote from said pillow block intermediate the ends thereof.

15. A hack saw frame comprising a body member, retaining means carried by said body member and engageable with one end of a blade, an element shiftably supported on said body member for movement toward and away from said retaining means, holding means carried by said element and engageable with the other end of such blade, a tensioning device comprising a barrel having a bottom and an open mouth, a finger projecting radially from said barrel and inclined to a plane normal to the axis of said barrel so that the distal end of said finger is located forwardly beyond the open mouth of said barrel, a plunger reciprocably mounted in said barrel, a coiled spring received in said barrel and confined between said barrel bottom and said plunger, the free end of said element being threaded, a rocker having an intermediate section rockably supported by said body member, one end of said rocker being movably associated with said element, a nut threadedly mounted on the threaded end of said element and bearing on said one end of said rocker, a post supported on said body member in substantial parallelism with said element with its free end threaded, the other end of said rocker being movably associated with said post, said finger traversing said post, the distal end of said finger and said plunger engaging said rocker, and a nut threadedly mounted on the threaded end of said post and bearing upon said finger intermediate the ends thereof.

16. In the organization of claim 12, means fixed with respect to said body member and operatively associated with said tensioning device to limit movement thereof relative to said body member under the influence of said spring.

DEWEY E. GOMMEL.

REFERENCES CITED

The following references are of record in the file of this patent:

UNITED STATES PATENTS

| Number | Name | Date |
| --- | --- | --- |
| 1,088,284 | Jones | Feb. 24, 1914 |
| 1,602,448 | Pine | Oct. 12, 1926 |
| 1,634,692 | Slaght | July 5, 1927 |
| 2,208,843 | Hedgpeth | July 23, 1940 |
| 2,300,047 | Jensen et al. | Jan. 1, 1923 |
| 2,337,629 | Shortell | Dec. 28, 1943 |

FOREIGN PATENTS

| Number | Country | Date |
| --- | --- | --- |
| 191,105 | Great Britain | Jan. 1, 1923 |